(12) United States Patent
Rhead (10) Patent No.: US 11,651,670 B2
(45) Date of Patent: May 16, 2023

(54) FLAME DETECTION DEVICE AND METHOD

(71) Applicant: Carrier Corporation, Palm Beach Gardens, FL (US)

(72) Inventor: Jamie Rhead, Plymouth, MN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 337 days.

(21) Appl. No.: 17/255,595

(22) PCT Filed: Jul. 9, 2020

(86) PCT No.: PCT/US2020/041380
§ 371 (c)(1),
(2) Date: Dec. 23, 2020

(87) PCT Pub. No.: WO2021/011300
PCT Pub. Date: Jan. 21, 2021

(65) Prior Publication Data
US 2022/0051539 A1 Feb. 17, 2022

Related U.S. Application Data

(60) Provisional application No. 62/875,614, filed on Jul. 18, 2019.

(51) Int. Cl.
*G08B 17/12* (2006.01)
*G06T 7/246* (2017.01)
*G06V 20/52* (2022.01)

(52) U.S. Cl.
CPC ............ *G08B 17/125* (2013.01); *G06T 7/246* (2017.01); *G06V 20/52* (2022.01);
(Continued)

(58) Field of Classification Search
CPC .................. G08B 17/125; G06T 7/246; G06T 2207/10024; G06T 2207/10048; G06T 2207/20056; G06V 20/52
(Continued)

(56) References Cited

U.S. PATENT DOCUMENTS 6,184,792 B1 2/2001 Privalov et al.
6,515,283 B1 2/2003 Castleman et al.
(Continued)

FOREIGN PATENT DOCUMENTS

CN 100556120 10/2009
CN 101673448 3/2012
(Continued)

OTHER PUBLICATIONS

Chen et al., "RGB Color Decomposition and Image Feature Extraction of Flame Image in Rear of Sintering Machine," Jul. 26-28, 2017, Proceedings of the 36th Chinese Control Conference, Dalian, China. (Year: 2017).*

(Continued)

*Primary Examiner* — Kenny A Cese
(74) *Attorney, Agent, or Firm* — Carlson, Gaskey & Olds, P.C.

(57) ABSTRACT

A method of detecting a flame in an image comprising the step of acquiring a series of infrared images from an infrared imager. Image flow vectors are calculated for each of the series of infrared images and stored in a corresponding 2D vector array. At least one 3D image flow data set is generated from the corresponding 2D vector arrays. A 2D pixel intensity array is generated for each of the series of infrared images. A 3D pixel intensity data set is generated from the 2D pixel intensity arrays. A Fourier Transform and infrared metrics are calculated. The infrared metrics are compared to an infrared threshold criteria. A corresponding 2D threshold (Continued)

array for each of the series of infrared images is generated. A 3D threshold data set is generated from the 2D threshold arrays. A flame status is determined based on the 3D threshold data set.

20 Claims, 6 Drawing Sheets

(52) U.S. Cl.
CPC ............... *G06T 2207/10024* (2013.01); *G06T 2207/10048* (2013.01); *G06T 2207/20056* (2013.01)

(58) Field of Classification Search
USPC ........................................................ 382/103
See application file for complete search history.

(56) References Cited

U.S. PATENT DOCUMENTS

| | | |
|---|---|---|
| 6,611,207 B1 | 8/2003 | Yuna et al. |
| 6,696,958 B2 | 2/2004 | Anderson |
| 6,963,662 B1 | 11/2005 | LeClerc et al. |
| 7,089,796 B2 | 8/2006 | Chen et al. |
| 7,202,794 B2 | 4/2007 | Huseynov et al. |
| 7,280,696 B2 | 10/2007 | Zakrzewski et al. |
| 7,286,704 B2 | 10/2007 | Pfefferseder et al. |
| 7,310,109 B2 | 12/2007 | Dottling et al. |
| 7,495,573 B2 | 2/2009 | Tice et al. |
| 7,542,585 B2 | 6/2009 | Chen |
| 7,574,039 B2 | 8/2009 | Ibrahim et al. |
| 7,609,856 B2 | 10/2009 | Chen et al. |
| 7,680,297 B2 | 3/2010 | Privalov |
| 7,769,204 B2 | 8/2010 | Privalov |
| 7,786,877 B2 | 8/2010 | Hou |
| 7,805,002 B2 | 9/2010 | Privalov |
| 7,859,419 B2 | 12/2010 | Shen-Kuen et al. |
| 7,868,772 B2 | 1/2011 | Chao et al. |
| 7,876,229 B2 | 1/2011 | Rao et al. |
| 7,945,076 B2 | 5/2011 | DeLean |
| 8,159,539 B2 | 4/2012 | Zhao et al. |
| 8,208,723 B2 | 6/2012 | Yamagishi et al. |
| 8,311,345 B2 | 11/2012 | Chu et al. |
| 8,619,073 B2 | 12/2013 | Zhang et al. |
| 8,941,734 B2 | 1/2015 | Mian et al. |
| 9,007,223 B2 | 4/2015 | Knox et al. |
| 9,047,515 B2 | 6/2015 | Certin et al. |
| 9,449,240 B2 | 9/2016 | Lorenzoni |
| 9,449,485 B2 | 9/2016 | Lapp |
| 9,530,074 B2 | 12/2016 | Newton et al. |
| 9,747,501 B2 | 8/2017 | Seo |
| 9,990,824 B2 | 6/2018 | Rao et al. |
| 9,990,825 B2 | 6/2018 | Rao et al. |
| 10,255,506 B2 | 4/2019 | Lorenzoni |
| 10,304,306 B2 | 5/2019 | Mills et al. |
| 2016/0335796 A1 | 11/2016 | Roimela |
| 2017/0363475 A1 | 12/2017 | Baliga et al. |
| 2020/0054905 A1* | 2/2020 | Livchak ............... G08B 29/188 |

FOREIGN PATENT DOCUMENTS

| | | |
|---|---|---|
| CN | 101944267 | 4/2012 |
| CN | 102163361 | 10/2012 |
| CN | 101441712 | 3/2013 |
| CN | 102708647 | 11/2013 |
| CN | 102760230 | 7/2014 |
| CN | 204029106 | 12/2014 |
| CN | 102708353 | 1/2015 |
| CN | 102332092 | 4/2015 |
| CN | 103020588 | 4/2016 |
| CN | 103400463 | 8/2016 |
| CN | 103761529 | 6/2017 |
| CN | 104036611 | 6/2017 |
| CN | 104504382 | 1/2018 |
| CN | 105512667 | 1/2019 |
| CN | 109118702 | 1/2019 |
| CN | 109147259 | 1/2019 |
| CN | 105046868 | 9/2019 |
| CN | 108416968 | 9/2020 |
| EP | 2000998 | 1/2013 |
| GB | 2360355 | 9/2001 |
| GB | 2528195 | 1/2016 |

OTHER PUBLICATIONS

Ruchanurucks et al. (Non-Patent Literature titled "Fire flame detection using color segmentation and space-time analysis", 2011, International Conference on Graphic and Image Processing, Cairo, Egypt (Year: 2011).*
International Preliminary Report on Patentability for International Application No. PCT/US2020/041380 dated Jan. 18, 2022.
Toreyin, B., Cinbis, R., Dedeoglu, Y., Cetin, A. Fire detection in infrared video using wavelet analysis. Ankara, Turkey. Jun. 29, 2007. pp. 1-9.
Cetin, A., Dimitropoulos, K., Gouverneur, B., Grammalidis, N., Gunay, O., Habiboglu, Y., Toreyin, Verstockt, V. Bilkent Video Fire Detection Review. University, Ankara, Turkey. Jul. 2013. pp. 1-17.
International Search Report and Written Opinion for International Application No. PCT/US2020/041380 dated Oct. 27, 2020.

* cited by examiner

FLAME DETECTION DEVICE AND METHOD

CROSS-REFERENCE TO RELATED APPLICATIONS

This application claims priority to U.S. Provisional Application No. 62/875,614, which was filed on Jul. 18, 2019 and is incorporated herein by reference.

BACKGROUND

The disclosure relates to flame detection, and in particular a device and method for detecting the presence of fire.

Traditional approaches for detecting fire include particle sampling (i.e., smoke detectors) and temperature sensors. While accurate, these methods include a number of drawbacks. For instance, traditional particle or smoke detectors require smoke to physically reach a sensor. In some applications, the location of the fire or the presence of heating, ventilation, and air conditioning (HVAC) systems prevents smoke from reaching the detector for an extended length of time, allowing the fire time to spread. A typical temperature sensor requires the sensor to be located physically close to the fire, because the temperature sensor will not sense a fire until a sufficient amount of the heat that the fire produces has spread to the location of the temperature sensor. In addition, neither of these systems provides as much data as might be desired regarding size, location, or intensity of the fire.

SUMMARY

In one exemplary embodiment, a method of detecting a flame in an image comprises the step of acquiring a series of infrared images from an infrared imager. Image flow vectors are calculated for each of the series of infrared images and are stored in a corresponding 2D vector array. At least one 3D image flow data set is generated from the corresponding 2D vector arrays. A 2D pixel intensity array is generated for each of the series of infrared images. A 3D pixel intensity data set is generated from the 2D pixel intensity arrays. A 2D array of 1D Fourier Transforms is calculated based on the at least one 3D image flow data set and the 3D pixel intensity data set. Infrared metrics are calculated based on the at least one 3D image flow data set, the 3D pixel intensity data set, the 2D Fourier Transform array that is based on the 3D image flow data set and the 2D Fourier Transform array that is based on the 3D pixel intensity data set. The infrared metrics are compared to infrared threshold criteria to detect a flame. A corresponding 2D threshold array for each of the series of infrared images is generated based on the infrared metrics. A 3D threshold data set is generated from the 2D threshold arrays. A flame status is determined based on the 3D threshold data set. The flame status is conveyed to a user device.

In a further embodiment of any of the above, the step of calculating the image flow vectors for each of the series of infrared images includes calculating an absolute magnitude of the image flow vectors.

In a further embodiment of any of the above, the step of calculating the image flow vectors for each of the series of infrared images includes calculating an amplitude of the image flow vectors at least one direction.

In a further embodiment of any of the above, the infrared metrics for the 3D image flow data set and the 3D pixel intensity data set include at least one of a minimum value, a maximum value, an average value, a median value, and a percent modulation.

In a further embodiment of any of the above, the infrared metrics for the 2D array of Fourier Transforms based on the at least one 3D image flow data set and the 2D array of Fourier Transforms based on the 3D pixel intensity data set include temporal frequency metrics of at least one of peak amplitude, frequency at peak amplitude, and percent modulation.

In a further embodiment of any of the above, the 2D threshold array includes an analysis of each pixel for each of the series of infrared images indicating a presence of the flame located at each of the pixels.

In a further embodiment of any of the above, a series of second images are acquired from a second imager.

In a further embodiment of any of the above, the method further includes the steps of calculating image flow vectors for each of the series of second images and storing the image flow vectors for each of the series of second images in a corresponding second 2D vector array. At least one second 3D image flow data set is generated from the corresponding second 2D vector arrays. A 2D array of 1D Fourier Transforms is calculated based on the at least one second 3D image flow data set. Second imager metrics are calculated based on the at least one second 3D image flow data set and the 2D array of Fourier Transforms based on the at least one second 3D image flow data set. The second metrics are compared to second imager threshold criteria to detect a flame. A corresponding second 2D threshold array is generated for each of the series of images from the second imager and a second 3D threshold mapping data set is generated from the second 2D threshold arrays. The flame status is validated based on the second 3D threshold mapping data set. An updated flame status is conveyed to the user device.

In a further embodiment of any of the above, the second imager includes a visible light imager and the image flow vectors for each of the series of second images are based on at least one of red light reception, green light reception, or blue light reception by the visible light imager.

In a further embodiment of any of the above, the second imager includes at least one of an ultraviolet imager or a near-infrared imager.

In a further embodiment of any of the above, the second imager includes at least one of a mid-wave infrared imager or long-wave infrared imager.

In a further embodiment of any of the above, the method further includes generating a second 2D pixel intensity array for each of the series of second images. A second 3D pixel intensity data set is generated based on the second 2D pixel intensity arrays for each of the series of second images. A 2D array of 1D Fourier Transforms is calculated based on the second 3D pixel intensity data set. Second infrared metrics are calculated for the second 3D pixel intensity data set and the 2D array of Fourier Transforms based on the second 3D pixel intensity data set.

In a further embodiment of any of the above, the flame status is indicated to a user device by highlighting a region on a display identifying a flame region.

In a further embodiment of any of the above, determination of the flame status includes image processing with at least one of spatial blob analysis or blob motion analysis.

In another exemplary embodiment, an image recognition system includes an infrared imager. A controller is in electrical communication with the infrared imager and includes a microprocessor. A computer readable medium is configured to cause the controller to perform the following steps including acquiring a series of infrared images from an infrared imager and calculating image flow vectors for each of the series of infrared images and storing the image flow vectors in a corresponding 2D vector array. At least one 3D image flow data set is generated from the corresponding 2D vector arrays. A 2D pixel intensity array is generated for each of the series of infrared images. A 3D pixel intensity data set is generated from the 2D pixel intensity arrays. A 2D array of 1D Fourier Transforms is calculated based on the at least one 3D image flow data set and the 3D pixel intensity data set. Infrared metrics are calculated based on the 3D image flow data set, the 3D pixel intensity data set, the 2D array of Fourier Transforms based on the 3D image flow data set, and the 2D array of Fourier Transforms based on the 3D pixel intensity data set. The infrared metrics are compared to threshold criteria to detect a flame. A corresponding 2D threshold array is generated for each of the series of infrared images based on the infrared metrics. A 3D threshold data set is generated from the 2D threshold arrays. A flame status is determined based on the 3D threshold data set. The flame status is conveyed to a user device.

In a further embodiment of any of the above, the controller is further configured to perform the step of acquiring a series of second images from a second imager.

In a further embodiment of any of the above, the controller is further configured to perform the following steps including calculating image flow vectors for each of the series of second images and storing the image flow vectors for each of the series of second images in a corresponding second 2D vector array. At least one second 3D image flow data set is generated from the corresponding second 2D vector array. A 2D array of 1D Fourier Transforms is calculated based on the at least one second 3D image flow data set. Second imager metrics are calculated based on the at least one second 3D image flow data set and the 2D array of Fourier Transforms based on the at least one second 3D image flow data set. The second metrics are compared to a second imager threshold criteria to detect a flame. A corresponding second 2D threshold array is generated for each of the series of images from the second imager and a second 3D threshold mapping data set is generated from the second 2D threshold arrays. The flame status is validated based on the second 3D threshold mapping data set. An updated flame status is conveyed to the user device.

In a further embodiment of any of the above, the second imager includes a visible light imager. The image flow vectors for each of the series of second images are based on at least one of red light reception, green light reception, and blue light reception by the visible light imager.

In a further embodiment of any of the above, the second imager includes at least one of a mid-wave infrared imager or a long-wave infrared imager.

In a further embodiment of any of the above, the controller is further configured to perform the following steps including generating a second 2D pixel intensity array for each of the series of second images. A second 3D pixel intensity data set is generated based on the second 2D pixel intensity arrays for each of the series of second images. A 2D array of 1D Fourier Transforms is calculated based on the second 3D pixel intensity data set. Second infrared metrics are calculated for the second 3D pixel intensity data set and the 2D array of Fourier Transforms based on the second 3D pixel intensity data set.

DETAILED DESCRIPTION

Figure 1:
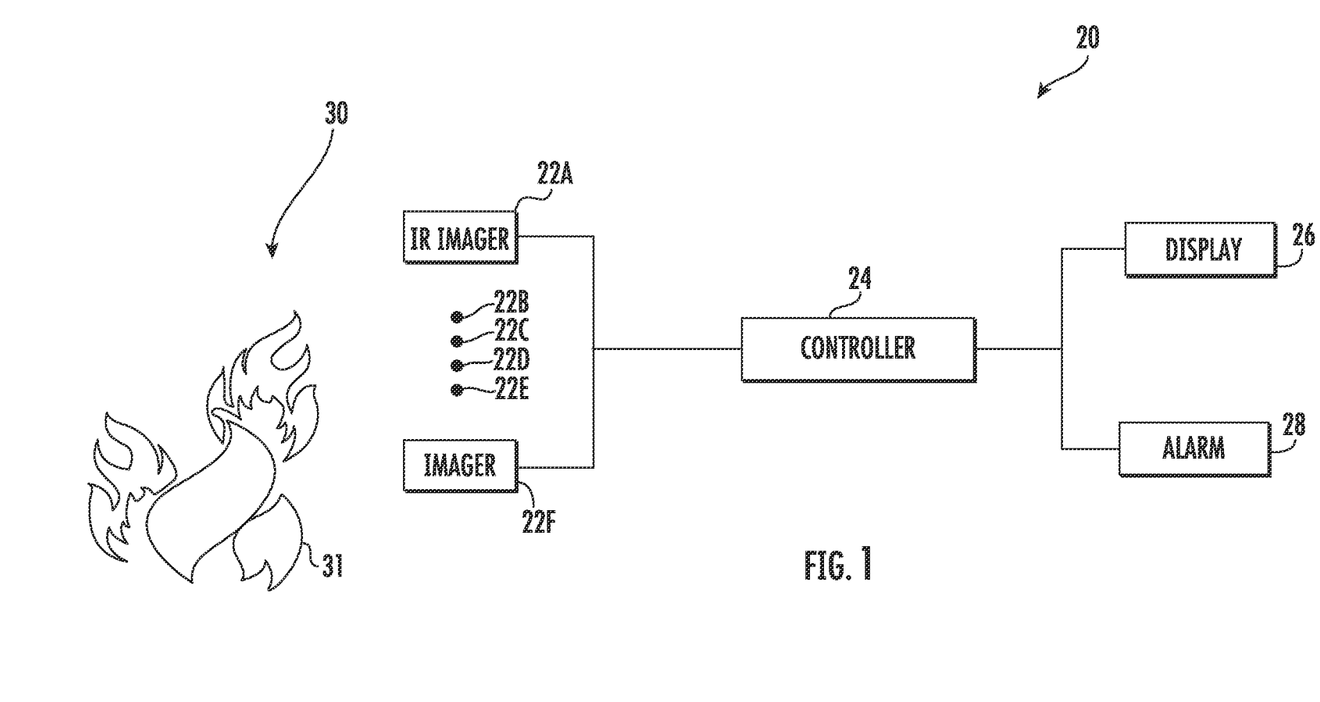
FIG. 1 illustrates an example image recognition system.

FIG. 1 illustrates an example image recognition system 20 for identifying the presence of a flame 31 in a scene 30. The image recognition system 20 acquires a series of images with at least one imager 22. In the illustrated example, the at least one imager includes an infrared imager 22A. The series of images are processed by a controller 24 to provide information regarding the presence of a flame 31 to a display 26 to be viewed by a user or to trigger an alarm 28 to notify the user of a potential flame 31 in the scene 30. In order to perform the image processing, the controller 24 includes a microprocessor in communication with memory for storing programs to analyze the series of images collected by the at least one imager 22. The system 20 can also include additional imagers 22B-F for validating the potential of the flame 31 in the scene 30 determined by the infrared imager 22A as will be discussed further below.

Figure 2:
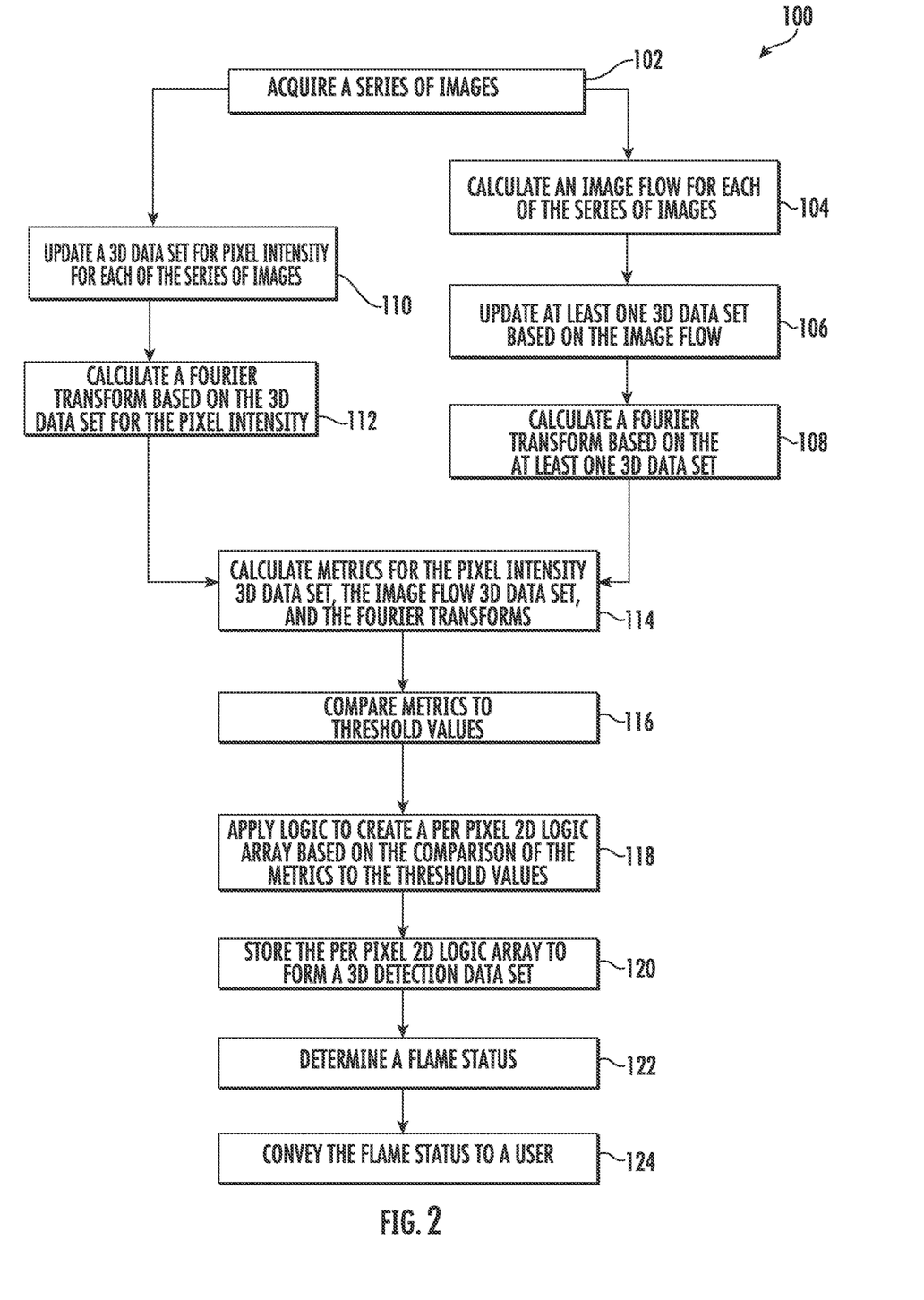
FIG. 2 illustrates an example method of operating the image recognition system.
Figure 3:
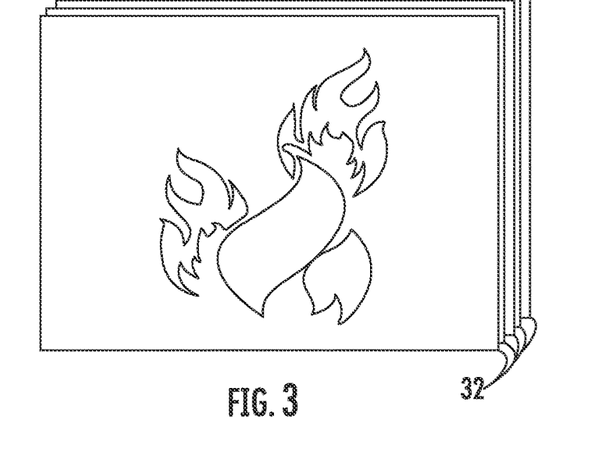
FIG. 3 illustrates an example series of images.

FIG. 2 illustrates a method 100 of operating the image recognition system 20. The method 100 is stored on a computer readable medium, such as the memory, which is configured to cause the controller 24 to perform the method 100 outlined in FIG. 2 and described below. Initially, the system 20 acquires a series of infrared images 32 (FIG. 3) from the infrared imager 22A of the scene 30 for determining the presence of the flame 31. Step 102. The infrared imager 22A is capable of capturing imagery that indicates the heat signature of the scene on a per pixel basis of the images 32. Each image 32 in the series of images 32 is composed of an array of pixels defined in an X-Y or Cartesian coordinate system. The series of images 32 may be of a fixed number of recent sequential images which is maintained on an ongoing basis by adding new images and removing old images as new images are available.

Figure 4:
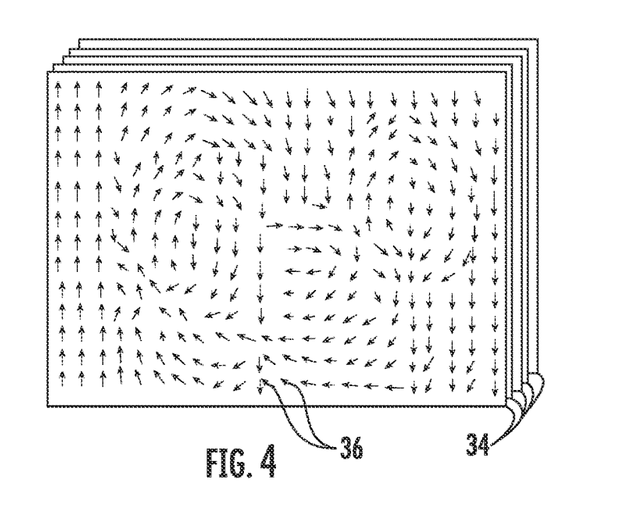
FIG. 4 illustrates an example series of image flows.
Figure 5:
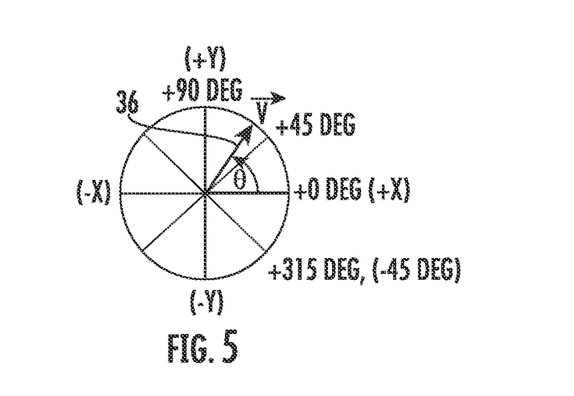
FIG. 5 illustrates an example vector from one of the image flows in a Cartesian coordinate system.

With the series of infrared images 32 captured by the infrared imager 22A and stored in the memory in the controller 24, the controller 24 calculates an image flow 34 (FIG. 4) for each image 32 in the series of infrared images 32. Step 104. The calculated image flow 34 includes a plurality of vectors 36 that correspond to each pixel in a corresponding one of the images 32. The image flow 34 is calculated using existing methods and algorithms, such as the Lucas Kanade method. Furthermore, the image flow 34 is calculated for a given infrared image 32 by using the infrared image 32 immediately preceding the given infrared image 32 in the series as a reference frame. The vectors 36 in the image flows 34 can be represented in a Cartesian coordinate system as having an absolute magnitude or length and an angle θ relative to the X-axis as shown in FIG. 5.

Figure 6:
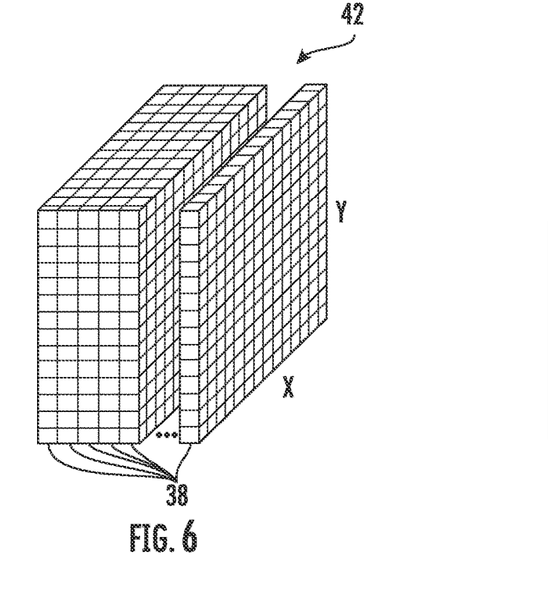
FIG. 6 illustrates a series of 2D magnitude arrays forming a 3D magnitude data set.

The magnitude for each vector 36 in the image flow 34 is stored in a corresponding cell of a 2D magnitude array 38 as shown in FIG. 6. The 2D magnitude arrays 38 are stored in the memory for each image flow 34 of the series of images 32 for a predetermined number of images 32 to generate a 3D magnitude data set 42 (2D for spatial position and 1D for image number) as shown in FIG. 6.

Figure 7:
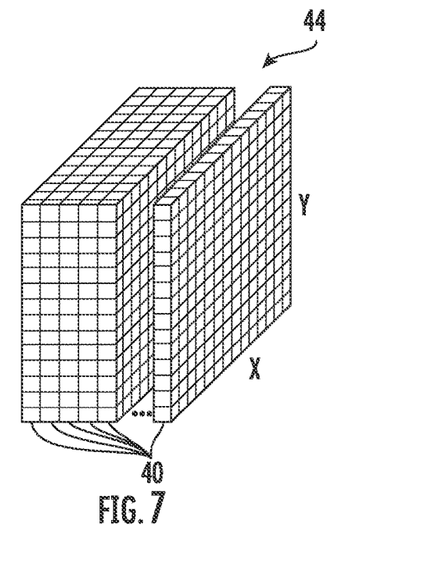
FIG. 7 illustrates a series of 2D angle arrays forming a 3D angle data set.
Figure 8:
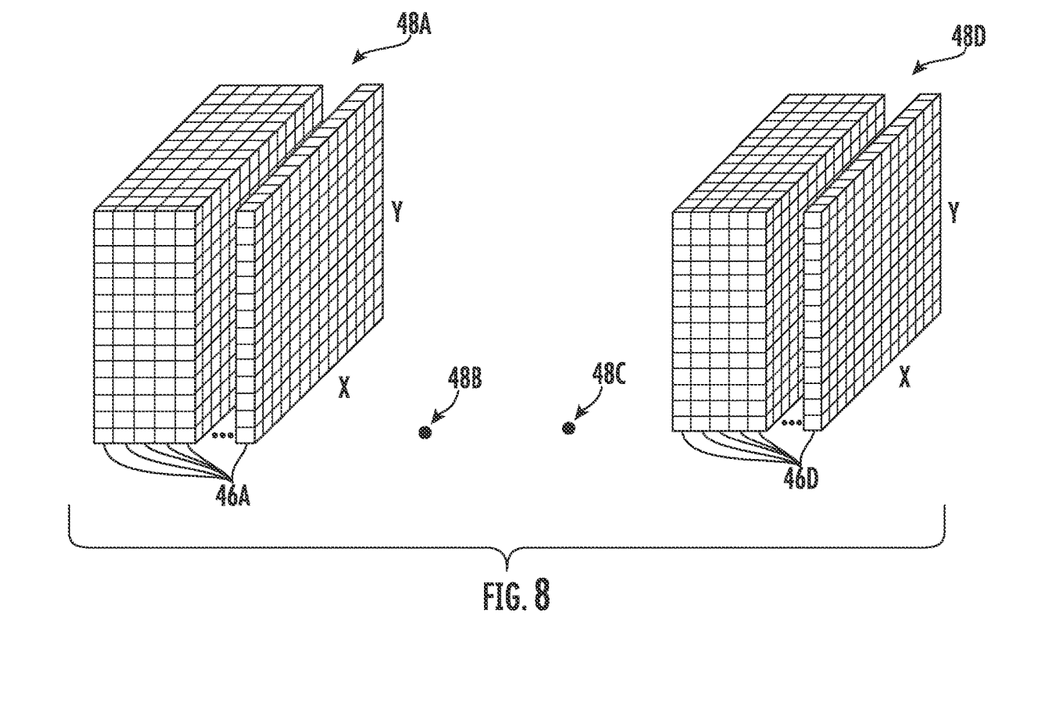
FIG. 8 illustrates a series of 3D direction data sets based on the 3D magnitude data set and the 3D angle data set.

Similarly, the angle θ for each vector 36 in each image flow 34 is stored in a corresponding cell of a 2D angle array 40 as shown in FIG. 7. The 2D angle arrays 40 are stored in the memory for each image flow 34 in the series of images 32 for a predetermined number of images 32 to generate a 3D angle data set 44 (2D for spatial position and 1D for image number) as shown in FIG. 7.

Additional information can be generated from the information stored in the 3D magnitude data set 42 and the 3D angle data set 44. For example, the magnitude values from the 2D magnitude arrays 38 can be used in connection with a corresponding angle from the 2D angle arrays 40 to determine an amplitude of the vectors 36 in each cell in a number of directions. As shown in FIG. 5, the amplitude of the vector 36 can be taken in the zero degree direction, 90 degree direction, 45 degree direction, and 315 degree direction.

The amplitude in the zero degree direction is provided in Equation 1 below by multiplying the absolute magnitude V from the 2D magnitude array 38 by the cosine of the angle θ from a corresponding cell in the 2D angle array 40. The amplitude in the 90 degree direction is provided in Equation 2 by multiply the absolute magnitude V from the 2D magnitude array 38 with the sine of the angle θ from the corresponding cell in the 2D angle array 40. The amplitude in the 315 degree direction is provided in Equation 3 by multiplying the absolute magnitude V from the 2D magnitude array 38 with the cosine of (θ+45 degrees) from the corresponding cell in the 2D angle array 40. The amplitude in the 45 degree direction is provided in Equation 4 by multiplying the absolute magnitude V from the 2D magnitude array 38 with the sine of (θ+45 degrees) from the corresponding cell in the 2D angle array 40.

$$V_0 = V\cos(\theta) \quad \text{Equation 1:}$$

$$V_{90} = V\sin(\theta) \quad \text{Equation 2:}$$

$$V_{315} = V\cos(\theta+45 \text{ deg.}) \quad \text{Equation 3:}$$

$$V_{45} = V\sin(\theta+45 \text{ deg.}) \quad \text{Equation 4:}$$

Figure 9:
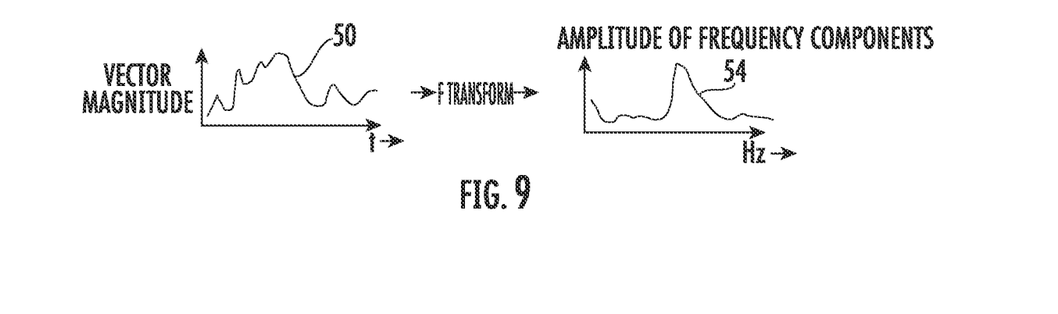
FIG. 9 illustrates a vector magnitude curve and its corresponding Fourier Transform curve.
Figure 10A:
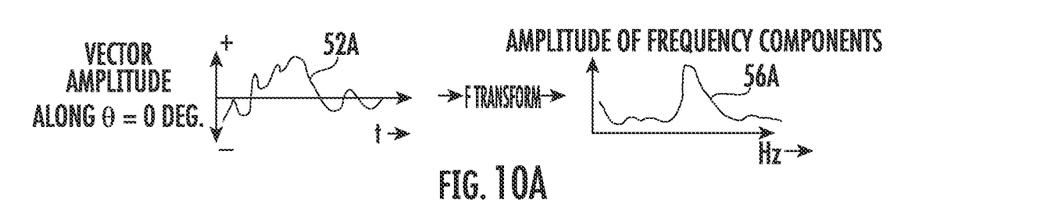
FIG. 10A illustrates a vector amplitude curve in the X direction along the Cartesian coordinate system and its corresponding Fourier Transform curve.
Figure 10B:
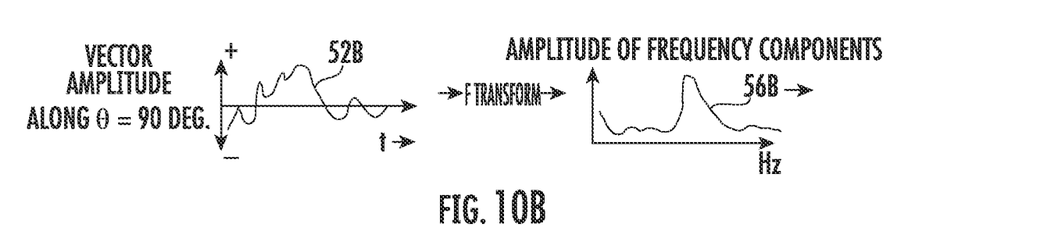
FIG. 10B illustrates a vector amplitude curve in the Y direction along the Cartesian coordinate system and its corresponding Fourier Transform curve.
Figure 10C:
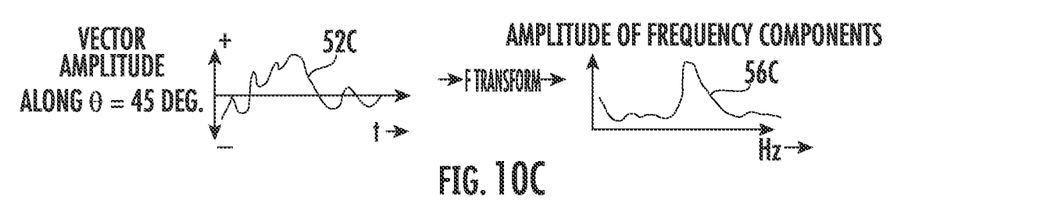
FIG. 10C illustrates a vector magnitude curve in the 45 degree direction and its corresponding Fourier Transform curve.
Figure 10D:
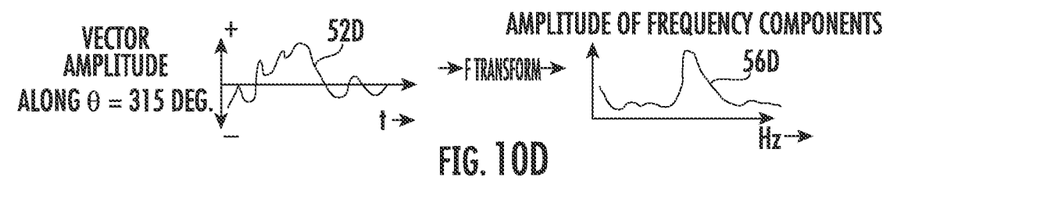
FIG. 10D illustrates a vector magnitude curve in the 315 degree direction and its corresponding Fourier Transform curve.

With reference to FIGS. 2-9, applying the above equations to the 2D magnitude arrays 38 and the 2D angle arrays 40 will result in a series of 2D directional arrays 46A-46D for each infrared image 32 that form a 3D directional data set 48A-48D over time in each of the chosen directions above. Step 106. As shown in FIG. 9, once the 3D directional data sets 48A-48D (FIG. 8) are formed from 2D vector arrays 38, 40, the controller 24 calculates a magnitude curve over time 50 based on the 3D magnitude data set 42 and, for each of the 3D directional data sets 48A-48D, respectively, calculates amplitude curves representing the directional amplitude of the vector 36 over time 52A-52D. The representations of data shown in FIGS. 9, 10A-10D, and 12 are for illustrative purposes only. The actual data will vary for each case as well as across the image.

A Fourier Transform of each of magnitude curve 50 and the amplitude curves 52A-52D is then performed by the controller 24 to produce a respective magnitude transform curve 54 and amplitude transform curves 56A-56D. Step 108. The magnitude transform curve 54 and the amplitude transform curves 56A-56D represent a frequency (Hz) of values based on their respective curves. The controller 24 then determines metrics for the magnitude curve 50 and amplitude curves 52A-52D including at least one of a minimum value, a maximum value, an average value, a median value, and a percent modulation and metrics for the transform magnitude curve 54 and the amplitude transform curves 56A-56D including at least one of peak amplitude, frequency at peak amplitude, and percent modulation. Step 114. These metrics are obtained from the spatial and temporal aspects of the images 32, using efficient calculation methods such as frequency analysis and image flow calculations, and are relatable to the physical characteristics of flames 31 (ex. flicker) for the purpose of flame detection.

Figure 11:
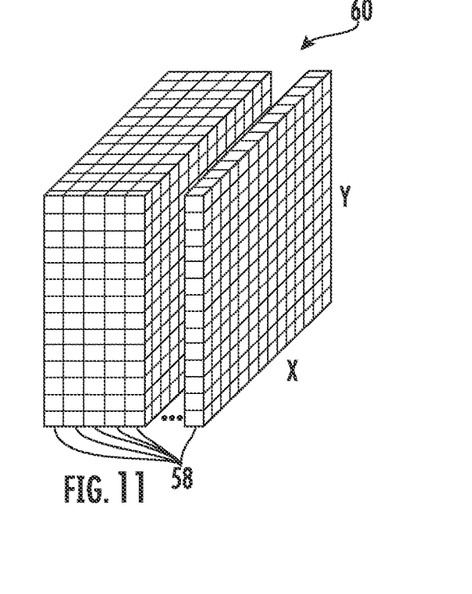
FIG. 11 illustrates a series of 2D pixel intensity arrays forming a 3D pixel intensity data set.
Figure 12:
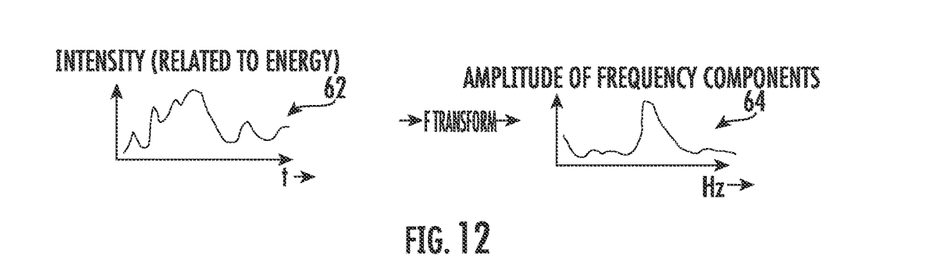
FIG. 12 illustrates a pixel intensity magnitude curve and its corresponding Fourier Transform curve.

Because the images 32 are infrared images, the images convey a heat signature through a pixel intensity for each pixel in the series of images 32. The pixel intensities for the infrared images 32 are stored in a series of corresponding 2D pixel intensity arrays 58 that forms a 3D pixel intensity data set 60 (FIG. 11). Step 110. The controller 24 calculates a magnitude curve 62 representing the magnitude of the pixel intensity for each corresponding cell in the 2D pixel intensity arrays 58 that form the 3D pixel intensity data set 60. A Fourier Transform of the magnitude curve 62 is then performed by the controller 24 to produce a transform magnitude curve 64. The transform magnitude curve 64 indicates a frequency of the magnitude curve 62. Step 112. The controller 24 then determines metrics for the magnitude curve 62 including at least one of a minimum value, a maximum value, an average value, a median value, and a percent modulation and metrics for the transform curve 64 include at least one of peak amplitude, frequency at peak amplitude, and percent modulation. Step 114.

Figure 13:
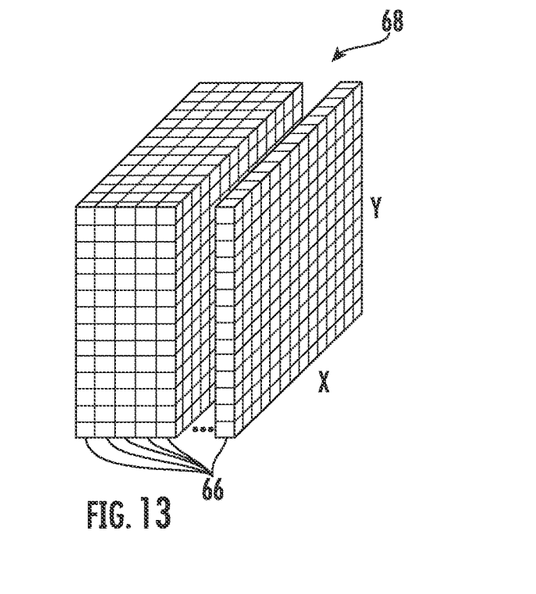
FIG. 13 illustrates a series of 2D logic arrays forming a 3D detection data set.

The controller 24 then compares to threshold values the metrics determined for the curves 50, 54, 52A-52D, 56A-56D, 62, and 64. Step 116. The controller 24 evaluates the comparison between the metrics for the curves 50, 54, 52A-52D, 56A-56D, 62, and 64 and the threshold values for each pixel and generates a 2D logic array 66 indicating whether or not a flame is detected in a given pixel (FIG. 13). Step 118. For example, a value of "1" in an array location would indicate a flame was detected in a corresponding pixel and a value of "0" would indicate that a flame was not detected in the corresponding pixel. The 2D logic array 66 is saved over time to create a 3D detection data set 68 (FIG. 13. Step 120).

The controller 24 then determines a 2D flame status based on the 3D detection data set 68. In one example, the controller 24 applies at least one of blob motion or blob analysis and/or applies a predetermined criterion for clustering and persistence. Step 122. The controller 24 then conveys the flame status to a user device of the system 20. Step 124. A user device may include a control panel interface, a mobile device such as a smart phone or other electronic user device with a display and an interface, a laptop, etc. The flame status can include highlight of a region of a portion of one of the images 32 on a display device, in order to indicate a region with a possible flame. Alternatively, the controller 24 could signal an alarm, for example, by sending a message indicating an alarm status to a control panel, or by sounding an audio device.

As discussed above, additional imagers 22 can be used in connection with the infrared imager 22A to further validate the results based on the series of infrared images and eliminate false positive flame detections. In one example, the additional imagers 22 could include a MidWave Infrared (MWIR) imager 22B and/or a LongWave Infrared (LWIR) imager 22C. These two imagers 22B and 22C cover wavelengths from approximately 3 to 14 microns with a 3 to 5 micron band being covered by the MWIR imager 22B and the 8 to 14 micron band being covered by the LWIR imager 22C. There is a lot of atmospheric absorption in about the 5 to 8 micron region, which makes it less useful in general.

Objects emit energy as a function of their temperature and as a function of wavelength. The imagers 22B, 22C may have a sensitivity over a wavelength band that is different than the wavelength band covered by the infrared imager 22A and can also provide approximate temperature or energy output of objects in the scene 30. Because the imagers 22B and 22C are infrared, the controller 24 processes a series of images from the imagers 22B and 22C in a similar manner as the series of images collected by the infrared imager 22A. Although the same metrics will apply to the images collected by the imagers 22B, 22C as the infrared imager 22A, the physical meaning of the metrics are different such that the threshold values in step 116 are different to account for variations in reception by the imagers 22B, 22C.

A visible light imager 22D could be used in addition to the imagers 22B, 22C or in place of the imagers 22B, 22C. The same method 100 and metrics can be used as above for MWIR or LWIR imagers 22B, 22C, but the thresholds would be applied differently as the results from the visible light imager 22D have a different physical meaning. Moreover, unlike infrared based imagers, the intensity values from a visible light imager are not relatable to physical quantities of energy or temperature.

Furthermore, since visible light is often measured in three channels, such as RED, GREEN, and BLUE, the opportunity exists to maintain additional metrics resulting from the ratios or summations of the channels. For example, analogous to the pixel intensity maintained for infrared, a 2D array of RED+GREEN+BLUE may be determined to provide a total intensity that is stored over time to maintain a 3D light intensity data set. Other combinations could be stored in a 2D array over time to form a 3D data set such as just red or RED/(GREEN+BLUE). The same metrics can be derived as were derived for the infrared (related to frequency, image flow, etc.).

One additional feature of the visible light imager 22D, is that water and/or water vapor in the atmosphere are fairly transparent in the visible light region measured by the visible light imager 22D. Additionally, visible light imagers 22D are inexpensive compared to infrared based imagers.

One additional type of imager that could be used in connection with the infrared imager 22A is an ultraviolet imager 22E. For flame detection, the most useful UV band is the UV-C band of approximately 100 to 280 nm. The same metrics can be used as above for MWIR/LWIR imagers 22B, 22C, but the thresholds that would be applied would be different, as the results from the UV imager have a different physical meaning.

UV flame detectors are typically filtered to include just the 'UV-C' band because the sun's radiation at this band is absorbed by the earth's atmosphere. The result is that the ultraviolet imager 22E will not cause an alarm in response to radiation from the sun. Ultraviolet detectors and imagers 22E are sensitive to most fires with a sensitivity that differs from an infrared based imager. So a system that operates using both UV and IR has a validating feature over a system that operating solely in infrared. For example, a burning hydrogen flame radiates strongly in the UV-C band and a coal fire emits more weakly in the UV-C band but more strongly in infrared. However, UV imagers are obstructed by oil or grease in the optics and are sensitive to non-flame sources such as a plasma glow from an arc welding machine or lightening.

Yet another imager used in connection with the infrared imager 22A would be a Near-Infrared imager 22F. Near-Infrared imagers 22F covers wavelengths over approximately 0.75-1.4 μm. The same metrics can be used as above for MWIR and LWIR imagers 22B, 22C, but the thresholds that would be applied would be different as the results from the near IR imager have a different physical meaning. Similar to the visible light imager 22C, water and water vapor in the atmosphere are fairly transparent in Near-Infrared wavelength and Near-Infrared imagers can be relatively inexpensive compared to MWIR or LWIR imagers 22B, 22C.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of detecting a flame in an image comprising the steps of:
    acquiring a series of infrared images from an infrared imager;
    calculating image flow vectors for each of the series of infrared images and storing the image flow vectors in a corresponding 2D vector array;
    generating at least one 3D image flow data set from the corresponding 2D vector arrays;

generating a 2D pixel intensity array for each of the series of infrared images;

generating a 3D pixel intensity data set from the 2D pixel intensity arrays;

calculating a Fourier Transform based on the at least one 3D image flow data set and the 3D pixel intensity data set;

calculating infrared metrics based on the at least one 3D image flow data set, the 3D pixel intensity data set, the Fourier Transform based on the 3D image flow data set, and the Fourier Transform based on the 3D pixel intensity data set;

comparing the infrared metrics to an infrared threshold criteria to detect a flame;

generating a corresponding 2D threshold array for each of the series of infrared images based on the infrared metrics and generating a 3D threshold data set from the 2D threshold arrays;

determining a flame status based on the 3D threshold data set; and conveying the flame status to a user device.

2. The method of claim 1, wherein the step of calculating the image flow vectors for each of the series of infrared images includes calculating an absolute magnitude of the image flow vectors.

3. The method of claim 1, wherein the step of calculating the image flow vectors for each of the series of infrared images includes calculating an amplitude of the image flow vectors at least one direction.

4. The method of claim 1, wherein the infrared metrics for the 3D image flow data set and the 3D pixel intensity data set include at least one of a minimum value, a maximum value, an average value, a median value, and a percent modulation.

5. The method of claim 1, wherein the infrared metrics for the Fourier Transform based on the at least one 3D image flow data set and the Fourier Transform based on the 3D pixel intensity data set include temporal frequency metrics of at least one of peak amplitude, frequency at peak amplitude, and percent modulation.

6. The method of claim 1, wherein the 2D threshold array includes an analysis of each pixel for each of the series of infrared images indicating a presence of the flame located at each of the pixels.

7. The method of claim 1, further comprising acquiring a series of second images from a second imager.

8. The method of claim 7, further comprising the steps of:

calculating image flow vectors for each of the series of second images and storing the image flow vectors for each of the series of second images in a corresponding second 2D vector array;

generating at least one second 3D image flow data set from the corresponding second 2D vector arrays;

calculating a Fourier Transform based on the at least one second 3D image flow data set;

calculating second imager metrics based on the at least one second 3D image flow data set and the Fourier Transforms based on the at least one second 3D image flow data set;

comparing the second metrics to a second imager threshold criteria to detect a flame;

generating a corresponding second 2D threshold array for each of the series of images from the second imager and generating a second 3D threshold mapping data set from the second 2D threshold arrays;

validating the flame status based on the second 3D threshold mapping data set; and conveying to the user device an updated flame status.

9. The method of claim 8, wherein the second imager includes a visible light imager and the image flow vectors for each of the series of second images are based on at least one of red light reception, green light reception, or blue light reception by the visible light imager.

10. The method of claim 8, wherein the second imager includes at least one of an ultraviolet imager or a near-infrared imager.

11. The method of claim 9, wherein the second imager includes at least one of a mid-wave infrared imager or long-wave infrared imager.

12. The method of claim 11, further comprising:

generating a second 2D pixel intensity array for each of the series of second images;

generating a second 3D pixel intensity data set based on the second 2D pixel intensity arrays for each of the series of second images;

calculating a Fourier Transform based on the second 3D pixel intensity data set; and calculating second infrared metrics for the second 3D pixel intensity data set and the Fourier Transforms based on the second 3D pixel intensity data set.

13. The method of claim 1, wherein the flame status is indicated to a user device by highlighting a region on a display identifying a flame region.

14. The method of claim 1, wherein determining the flame status includes image processing with at least one of spatial blob analysis or blob motion analysis.

15. An image recognition system comprising:

an infrared imager;

a controller in electrical communication with the infrared imager and including a microprocessor and a computer readable medium configured to cause the controller to perform the following steps comprising:

acquiring a series of infrared images from an infrared imager;

calculating image flow vectors for each of the series of infrared images and storing the image flow vectors in a corresponding 2D vector array;

generating at least one 3D image flow data set from the corresponding 2D vector arrays;

generating a 2D pixel intensity array for each of the series of infrared images;

generating a 3D pixel intensity data set from the 2D pixel intensity arrays;

calculating a Fourier Transform based on the at least one 3D image flow data set and the 3D pixel intensity data set;

calculating infrared metrics based on the 3D image flow data set, the 3D pixel intensity data set, the Fourier Transform based on the 3D image flow data set, and the Fourier Transform based on the 3D pixel intensity data set;

comparing the infrared metrics to a threshold criteria to detect a flame;

generating a corresponding 2D threshold array for each of the series of infrared images based on the infrared metrics and generating a 3D threshold data set from the 2D threshold arrays;

determining a flame status based on the 3D threshold data set; and conveying the flame status to a user device.

16. The image recognition system of claim 15, wherein the controller is further configured to perform the following step comprising:

acquiring a series of second images from a second imager.

17. The image recognition system of claim 16, wherein the controller is further configured to perform the following steps comprising:

calculating image flow vectors for each of the series of second images and storing the image flow vectors for each of the series of second images in a corresponding second 2D vector array;

generating at least one second 3D image flow data set from the corresponding second 2D vector arrays;

calculating a Fourier Transform based on the at least one second 3D image flow data set;

calculating second imager metrics based on the at least one second 3D image flow data set and the Fourier Transforms based on the at least one second 3D image flow data set;

comparing the second metrics to a second imager threshold criteria to detect a flame;

generating a corresponding second 2D threshold array for each of the series of images from the second imager and generating a second 3D threshold mapping data set from the second 2D threshold arrays;

validating the flame status based on the second 3D threshold mapping data set; and conveying to the user device an updated flame status.

18. The image recognition system of claim 17, wherein the second imager includes a visible light imager and the image flow vectors for each of the series of second images are based on at least one of red light reception, green light reception, and blue light reception by the visible light imager.

19. The image recognition system of claim 17, wherein the second imager includes at least one of a mid-wave infrared imager or a long-wave infrared imager.

20. The image recognition system of claim 19, wherein the controller is further configured to perform the following steps comprising:

generating a second 2D pixel intensity array for each of the series of second images;

generating a second 3D pixel intensity data set based on the second 2D pixel intensity arrays for each of the series of second images;

calculating a Fourier Transform based on the second 3D pixel intensity data set; and calculating second infrared metrics for the second 3D pixel intensity data set and the Fourier Transform based on the second 3D pixel intensity data set.

* * * * *